(12) United States Patent
Schmid

(10) Patent No.: US 8,297,625 B2
(45) Date of Patent: Oct. 30, 2012

(54) TWO-LIP RUBBER SEAL WITH REINFORCEMENT

(75) Inventor: Reiner Schmid, Bingen/Hochberg (DE)

(73) Assignee: IFA Technologies GmbH, Haldensleben (DE)

( * ) Notice: Subject to any disclaimer, the term of this patent is extended or adjusted under 35 U.S.C. 154(b) by 233 days.

(21) Appl. No.: 12/799,286

(22) Filed: Apr. 21, 2010

(65) Prior Publication Data

US 2010/0270755 A1    Oct. 28, 2010

(30) Foreign Application Priority Data

Apr. 23, 2009   (DE) .......................... 10 2009 018 373

(51) Int. Cl.
    *F16J 15/12* (2006.01)
(52) U.S. Cl. ........................................ 277/644; 464/906
(58) Field of Classification Search ................... 464/170, 464/906; 277/608, 626, 627, 638, 644, 910, 277/530, 569, 647; 285/918
See application file for complete search history.

(56) References Cited

U.S. PATENT DOCUMENTS

| 332,667 | A | * | 12/1885 | Lyons ........................ 277/608 X |
| 2,977,143 | A | * | 3/1961 | Talamonti ..................... 277/569 |
| 3,865,386 | A | * | 2/1975 | Wilke |
| 3,990,711 | A | * | 11/1976 | Hill ............................... 277/910 |
| 5,607,167 | A | * | 3/1997 | Franckx .................... 277/627 X |
| 6,354,604 | B1 | | 3/2002 | Nicolai |
| 2009/0045592 | A1 | * | 2/2009 | Hurlbert et al. |

FOREIGN PATENT DOCUMENTS

DE           198 57 460        6/2000

* cited by examiner

*Primary Examiner* — Gregory Binda
(74) *Attorney, Agent, or Firm* — Collard & Roe, P.C.

(57) ABSTRACT

A seal for sealing a cardan shaft housing, particularly at a contact surface between an outer ring and a housing lid, has a first sealing element that at least partially covers the contact surface plane to be sealed, as well as a first shape-stabilizing element that is at least partially firmly connected with the first sealing element. A second sealing element is at least partially firmly connected on the shape-stabilizing element.

7 Claims, 4 Drawing Sheets

TWO-LIP RUBBER SEAL WITH REINFORCEMENT

CROSS REFERENCE TO RELATED APPLICATIONS

Applicant claims priority under 35 U.S.C. 119 of German Application No. 10 2009 018 373.6 filed Apr. 23, 2009.

BACKGROUND OF THE INVENTION

1. Field of the Invention

The invention relates to a seal for sealing a constant velocity joint as well as a correspondingly sealed cardan shaft.

2. The Prior Art

There are several applications for cardan shafts and/or constant velocity joints in the sector of technical mechanical engineering. Force-transferring constant velocity joints are used in the automotive industry, in which the cardan shaft is used between the power take-off of the transmission and the drive train.

A cardan shaft according to the state of the art is generally composed of an outer ring that accommodates the joint mechanism, which ring is configured as a corpus element that accommodates the joint, and at least one lid that closes off the outer ring with regard to the surroundings. Passages for corresponding connection shafts are provided in the region of the lid. The inner region of the outer ring, particularly the region of the joint, is filled with a lubricant for operation, and grease is preferably pressed into it, in order to minimize the wear due to friction. So that the lubricant applied into the inner region of the cardan shaft does not exit to the outside, it is necessary to seal the lid that closes off the outer ring, accordingly.

From the state of the art, for example from German Patent Application No. DE 198 57 460 A1, seal arrangements for a constant velocity joint are known, in which sealing means are introduced between the contact surfaces of the outer ring and the lid, which lie opposite one another. These sealing means are squeezed between the contact surface of the lid and the contact surface of the outer ring when attachment screws are tightened, and thus make the desired sealed condition available.

In ongoing operation, particularly during transfer of engine forces, the housing of the cardan shaft occasionally experiences greater torque surges, which can individually lead to a slip of up to 0.3 mm of the housing lid relative to the outer ring. In addition, cardan shafts, particularly when used in the motor vehicle sector, can be exposed to significant variations in operating temperature, so that in winter, for example, a cold-started car can have temperatures far below 0° C., but the operating temperature of a cardan shaft increases to 120° C. to 150° C. in ongoing operation.

Because of the torque surges and the thermal material expansion, particularly when using different materials, there is always the problem, in conventional seals, that they can slip, and project into the inner region of the outer ring, in other words into the joint mechanism, for example. As the result of such a problem, a leak occurs, for one thing, which leads to a constant loss of the lubricant medium—in the long term, the joint fails as a result.

SUMMARY OF THE INVENTION

It is therefore an object of the invention to provide a seal for sealing an outer ring, which provides improved resistance to slipping in normal operation of a cardan shaft.

This object is accomplished according to the invention by a seal for sealing an outer ring, particularly at a contact surface between a housing corpus and a housing lid, that comprises a first sealing element that at least partially covers the contact surface plane to be sealed. In the unassembled state, in other words when the housing lid is open, a stop or a depression can be provided on the side of the lid or on the side of the outer ring, which accommodates the corresponding seal, for simplified assembly. In the region that lies radially on the outside, seen from the longitudinal axis of the cardan shaft, a stop edge can also be provided around the seal, which edge guarantees a centered seat of the seal. According to the invention, a first shape-stabilizing element is firmly connected, at least partially, to the first sealing element. By means of the corresponding shape-stabilizing element, the progression shape of the sealing element, which is often flexible and soft, is guided and held along a defined line. The shape is thereby stabilized, so that the seal does not significantly deviate from its intended progression on the contact surface.

The seal according to the invention has a second sealing element that is firmly or at least partially firmly connected on the shape-stabilizing element.

The second sealing element, which is also connected to the shape-stabilizing element, represents a certain redundancy with regard to the sealing function of the seal, and furthermore stabilizes the seat of the seal between the outer ring and a housing lid, due to the connection to the shape-stabilizing element.

In another embodiment of the seal according to the invention, the shape-stabilizing element is disposed in the contact surface plane between the first sealing element and the second sealing element. Preferably, the shape-stabilizing element can engage into each of the sealing elements in order to produce the firm connection. By placing the shape-stabilizing element between the sealing elements, the result is achieved that the two sealing elements follow the shape of the shape-stabilizing element, in other words the desired progression in the contact surface plane to be sealed, without additional guide aids fundamentally being required. However, it can certainly be practical and advantageous to surround the seal with a stop edge in the region that lies toward the outside, radially away from the axis of symmetry of the cardan shaft, in order to simplify its positioning, particularly during assembly, but also in the assembled state.

In another practical embodiment of the seal according to the invention, the shape-stabilizing element has a smaller thickness, in its expanse that extends perpendicular to the sealing surface, than that of the individual sealing elements. Because of the thinner configuration of the shape-stabilizing element, it does not participate in the sealing effect of the seal as a whole, but rather merely serves for shape stabilization of the sealing elements. The torsion forces and thermal displacement forces that were described above as being disadvantageous thus affect the shape stabilization element only insignificantly, so that its progression is not significantly influenced. The sealing elements, which are generally squeezed between the surfaces to be sealed relative to one another in the assembled state, take over the redundant sealing effect, as already described.

In a practical embodiment of the seal according to the invention, the first and/or the second sealing element is configured as a type of O-ring seal, preferably made of rubber. O-ring seals represent proven methods for circumferential sealing of different surfaces to be sealed relative to one another, since they are closed in themselves, and thus do not allow exit of material, for example of lubricant material, at any radially circumferential location.

In another embodiment of the seal according to the invention, it has a reinforcement as a shape-stabilizing element, which can preferably be configured as a light-metal or steel or plastic ring, and, in particular, has a U shape in cross-section. Metal or plastic rings primarily have a particularly greater strength and, resulting from this, an extremely good shape stability, so that the shape-stabilizing properties of such a metal or plastic ring hold the sealing elements connected to it in their intended position. By means of the U-shaped structure, the metal ring can engage into the sealing elements with its two U shanks, holds them, or brings them to desired positions.

In another practical further development of the seal according to the invention, the first sealing element, the shape-stabilizing element, and the second sealing element are connected with one another by way of a crosspiece, preferably made of rubber, and/or coated with a protective layer, and/or provided with a connection layer that can preferably be configured as a rubber layer, at least on one side. In terms of production technology, it is advantageous to produce the two sealing elements so that they are connected with one another by way of a crosspiece, and to dispose the shape-stabilizing element between the sealing elements, parallel to the connection crosspiece.

In an even more practical embodiment of the seal according to the invention, the seal is configured to be circumferential, in ring shape, whereby depression-shaped deviations from the circular ring shape are provided in its progression, which deviations guide the seal around passages for connection means, through which screws run in the assembled state. By circumventing the passages for connection means with deviations from the circular ring shape, the smallest possible contact surface requirement for the best possible sealing result is obtained. An additional wall thickness of the joint corpus is only required in the region of the passages for connection means, which wall squeezes the seal between itself and the housing lid.

Furthermore, the invention relates to a cardan shaft, particularly a motor vehicle cardan shaft, which comprises an outer ring for accommodating a joint, at least one lid for closing off an opening on the outer ring, as well as connection means for connecting the lid with the outer ring, preferably screw connections, and sealing means between sealing surfaces of the corpus and of the lid that lie opposite one another in the connected state. The cardan shaft according to the invention is equipped with a seal according to the invention as described above. This seal can be provided at every opening of the outer ring that must be closed off with a lid.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF THE PREFERRED EMBODIMENT

Figure 1:
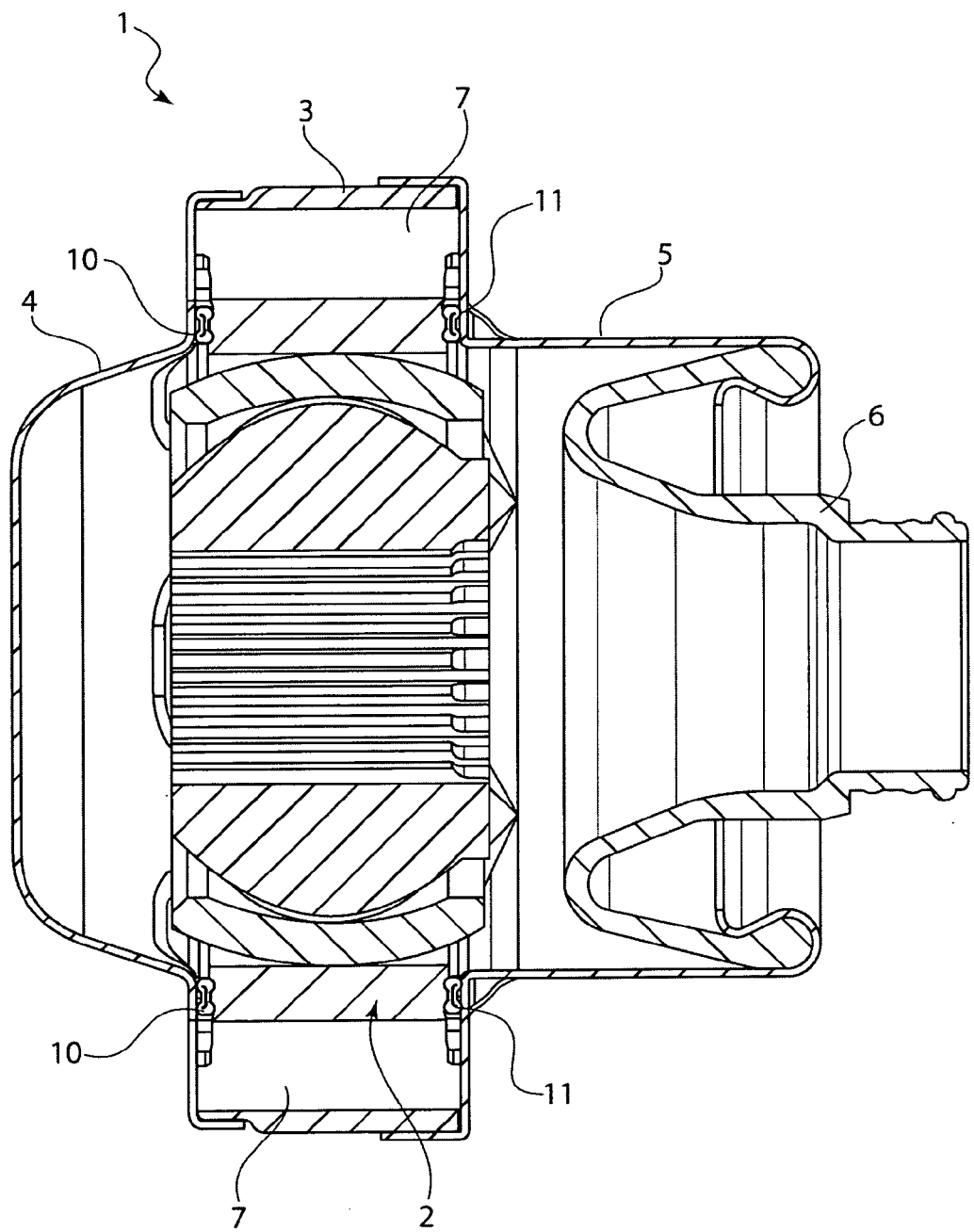
FIG. 1 shows a schematic cross-section through a cardan shaft according to the invention.

Referring now in detail to the drawings, FIG. 1 shows a cardan shaft 1 according to the invention, which comprises an outer ring 3 that accommodates a joint 2 and is configured as a corpus element. On both sides, outer ring 3 is closed off by a lid 4 on the transmission side and a lid 5 with joint cuff 6 for passing through the power take-off shaft (not shown here). The two lids 4 and 5 are attached to outer ring 3 by screw connections, which pass through outer ring 3 through a screw channel 7, and are braced relative to the ring. Outer ring 3 has circumferential seals that lie within screw channel 7, viewed relative to joint 2, which comprise a seal 10 between lid 4 on the transmission side and the contact surface of outer ring 3, and a seal 11 between lid 5 on the power take-off side and outer ring 3, on the contact surface. The surfaces of outer ring 3 and of lid 4 or 5 which run parallel to one another in the sealed state and between which seals 10 and 11, respectively, are squeezed, should be considered contact surfaces. The interior of the housing for a cardan shaft thus formed by outer ring 3, lid 4, and lid 5 can be filled with a lubricant, preferably with grease, in this manner, without it being possible for the lubricant to pass to the outside at the contact locations between outer ring 3 and lid 4 or lid 5, respectively.

Figure 2:
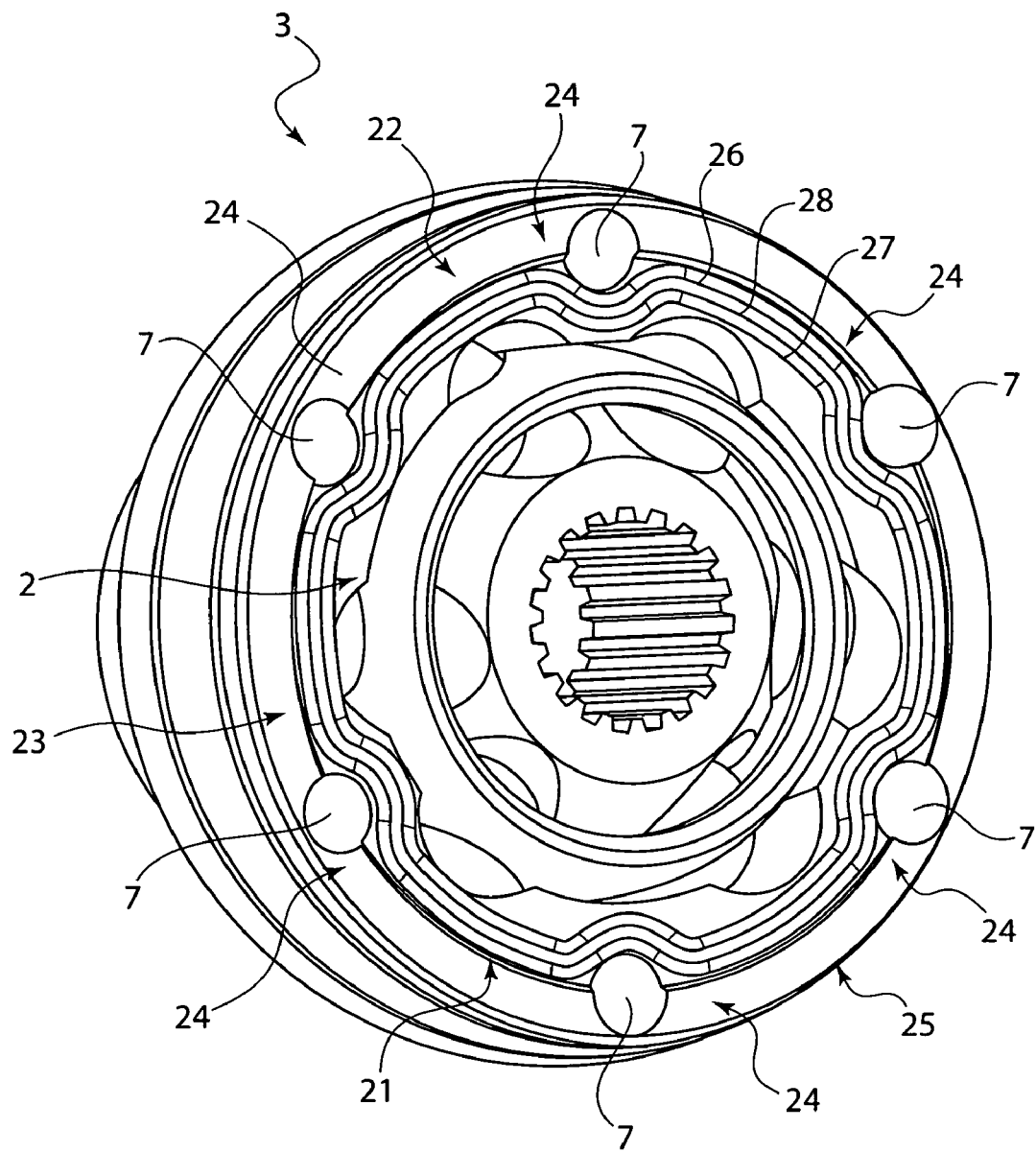
FIG. 2 shows a perspective representation of a cardan shaft corpus before closure with a housing lid.

FIG. 2 shows a schematic, perspective representation of an outer ring 3, which has a circumferential seal 21 according to the present invention. The seal runs on a contact surface 22, as a closed, ring-shaped seal, and is held in the radially outside direction by means of a delimitation crosspiece 23, which can be configured as a step in contact surface 22, for example. The circumferential seal 21 has regular deviations 24 from the circular shape in the region of screw channels 7, which are configured to circumvent screw channels 7, in order to always make available a seal with regard to the interior that houses joint 2. Outer ring 3 has corresponding step-like depressions at its edge 25, in order to improve setting on the housing lid that closes off the corpus, and the resulting formation of a cardan shaft housing. Circumferential seal 21 according to the invention has a first sealing element 26 that lies radially on the outside, a second sealing element 27 that lies radially on the inside, and a shape-stabilizing element 28 that runs between sealing elements 26 and 27. In this connection, sealing elements 26 and 27 are configured as sealing elements in the manner of O rings, and are squeezed between contact surface 22 and the housing lid when the cardan shaft housing is closed. The lid with seal 21 lying under it can seal the cardan shaft housing, by correspondingly passing screws through screw channel 7 and by means of the lid that is set on, from pressure of the lid contact surface on the seal 21, whereby the latter in turn is pressed onto contact surface 22.

Figure 3:
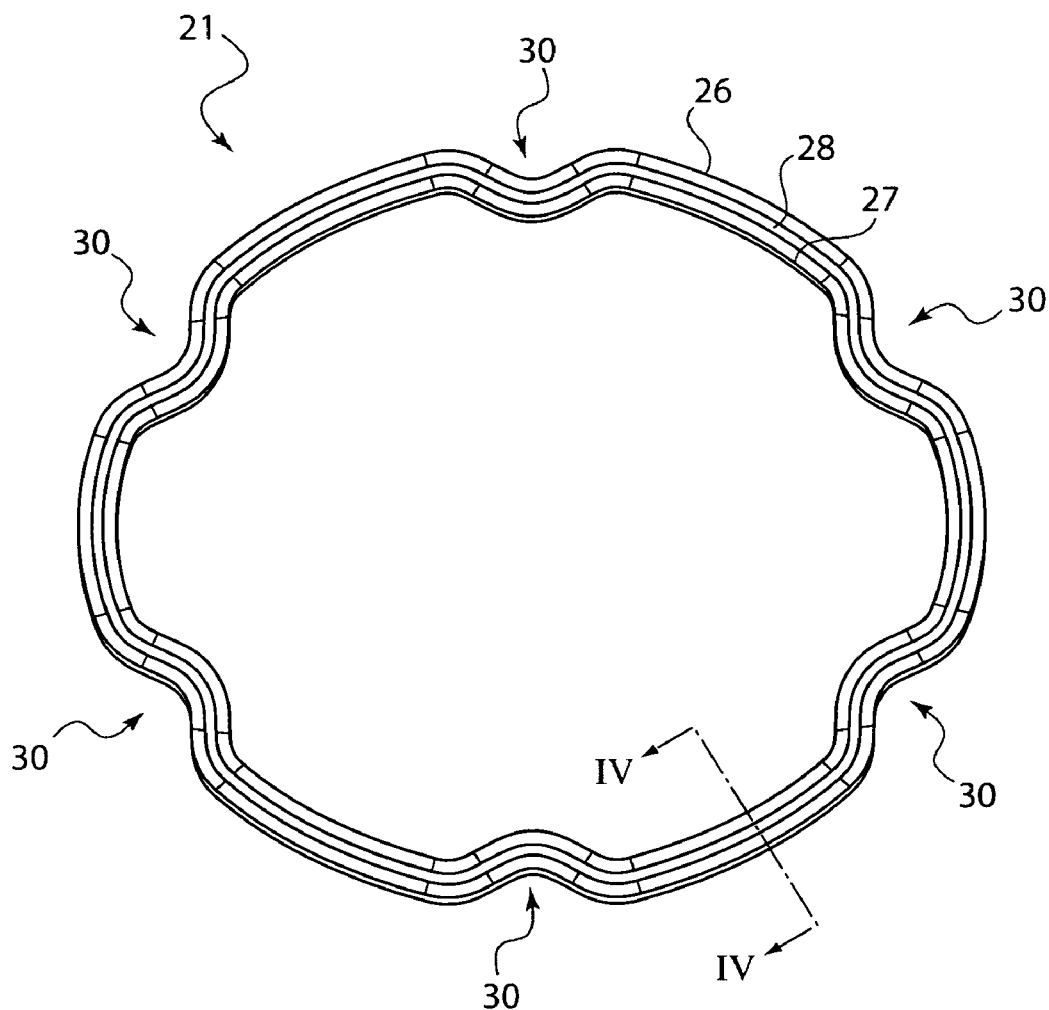
FIG. 3 shows a seal according to the invention.

FIG. 3 shows a circumferential ring seal 21 according to the invention, which has a first sealing element 26 that lies radially on the outside, a second sealing element 27 that lies radially on the inside, and a shape-stabilizing element 28. Shape stabilizing element 28 is in the form of a ring made of steel or light-metal alloy. Corresponding to the introduction of seal 21 into an outer ring 3 shown in FIG. 2, seal 21 has depressions 30 that are necessary to circumvent the screw connection elements that are passed through screw channels 7.

Figure 4:
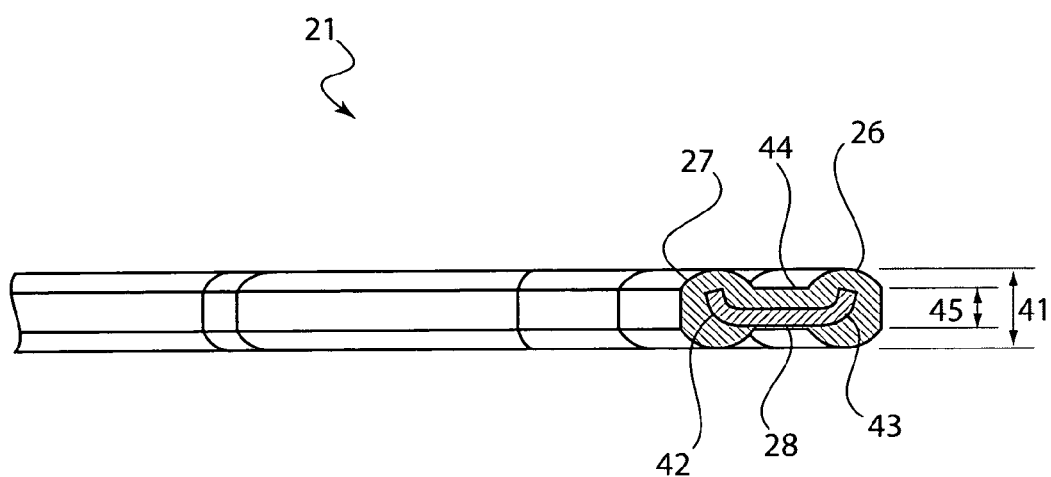
FIG. 4 shows a perspective, schematic representation of a section through a seal according to the invention.

FIG. 4 shows a schematic, perspective representation of a seal 21 according to the invention, along the section IV-IV shown in FIG. 3. Seal 21 according to the invention has a first sealing element 26, as well as a second sealing element 27. The sealing elements define the thickness, i.e. thickness of seal 41, particularly since they are configured as sealing rings similar to O rings. The shape-stabilizing element 28, which has a U shape, when viewed in cross-section, in the present case, is situated between sealing elements 26 and 27. The two shanks 42 and 43 engage into sealing elements 26 and 27, in each instance, and hold them firmly connected with the shape-stabilizing element 28. On one side of shape-stabilizing element 28, an additional continuous connection crosspiece 44 is provided, which connects first sealing element 26 with the second sealing element 27. The connection crosspiece 44 between sealing elements 26 and 27 represents an additional attachment of the two circumferential O-ring-like seals on one another. This crosspiece does not contribute to the shape stabilization in the sense of shape-stabilizing element 28. The thickness of shape-stabilizing element 45 is configured to be less in comparison with the thickness of seal 41, so that when the seal is introduced between the contact surfaces of outer ring 3 and the lid 4 or 5, respectively, when they are attached, a squeezing process takes place only with regard to first sealing element 26 and second sealing element 27, and the shape-stabilizing part 28 remains essentially unsqueezed between sealing elements 26 and 27. The seal 21 according to the invention has a shape similar to a dumbbell in cross-section, which is achieved essentially by means of the connection of two O rings with a stabilizing metal strip.

Accordingly, while only a few embodiments of the present invention have been shown and described, it is obvious that many changes and modifications may be made thereunto without departing from the spirit and scope of the invention.

REFERENCE SYMBOL LIST 1 cardan shaft
2 joint
3 outer ring (corpus element that accommodates the joint)
4 lid on transmission side
5 lid on power take-off side
6 joint cuff
7 screw channel
10 seal
11 seal
21 circumferential seal
22 contact surface
23 delimitation crosspiece
24 deviation
25 edge
26 radially outside first sealing element
27 radially inside second sealing element
28 shape-stabilizing element
30 depressions
41 seal
42 shank
43 shank
44 connection crosspiece
45 shape-stabilizing element

What is claimed is:

1. A seal for sealing a constant velocity joint at a contact surface between an outer ring and a housing lid, comprising:
   a first sealing element that is adapted to at least partially cover the contact surface to be sealed;
   a shape-stabilizing element that is at least partially connected with the first sealing element, and
   a second sealing element at least partially connected to the shape-stabilizing element;
   wherein the first and second sealing elements are disposed in a same plane and parallel to the contact surface,
   wherein the shape-stabilizing element extends in the plane parallel to the contact surface and between the first sealing element and the second sealing element, and engages into the first and second sealing elements, and
   wherein the shape-stabilizing element has a U-shaped cross-section.

2. The seal according to claim 1, wherein the shape-stabilizing element is configured to be thinner, in its expanse that extends perpendicular to the contact surface, than the sealing elements.

3. The seal according to claim 1, wherein at least one of the first and second sealing elements is configured as an O ring.

4. The seal according to claim 1, wherein the shape-stabilizing element is formed as a steel or light-metal alloy ring.

5. The seal according to claim 1, wherein the first sealing element, the shape-stabilizing element, and the second sealing element are connected to each other via a crosspiece formed by a coating of a protective layer or a connection layer, at least on one side of the sealing elements and shape-stabilizing element.

6. The seal according to claim 1, wherein the seal is configured circumferentially in ring shape and has depression-shaped deviations from the circular ring shape, to circumvent passages for connection means.

7. A cardan shaft comprising:
   an outer ring for accommodating a joint,
   at least one lid for closing off an opening on the outer ring;
   connection means for connecting the lid with the outer ring; and
   a seal disposed between sealing surfaces of the outer ring and of the lid that lie opposite one another in a connected state, the seal comprising:
   a first sealing element that is adapted to at least partially cover the sealing surfaces;
   a shape-stabilizing element that is at least partially connected with the first sealing element, and
   a second sealing element at least partially connected to the shape-stabilizing element;
   wherein the first and second sealing elements are disposed in a same plane and parallel to the sealing surfaces,
   wherein the shape-stabilizing element extends in the plane parallel to the sealing surfaces and between the first sealing element and the second sealing element, and engages into the first and second sealing elements, and
   wherein the shape-stabilizing element has a U-shaped cross-section.

* * * * *

UNITED STATES PATENT AND TRADEMARK OFFICE
CERTIFICATE OF CORRECTION

PATENT NO. : 8,297,625 B2  
APPLICATION NO. : 12/799286  
DATED : October 30, 2012  
INVENTOR(S) : Schmid Page 1 of 1

It is certified that error appears in the above-identified patent and that said Letters Patent is hereby corrected as shown below:

In particular, on the Title page, Column 1, Item [73], the name of the Assignee should correctly read:

--IFA-Technologies GmbH--.

Signed and Sealed this  
Second Day of April, 2013

Teresa Stanek Rea  
*Acting Director of the United States Patent and Trademark Office*